United States Patent [19]

Stonitsch et al.

[11] 4,221,405
[45] Sep. 9, 1980

[54] CONDUIT SYSTEM WITH EXPANSION COUPLING AND COMBINED SPACER AND SEALING SLEEVE

[76] Inventors: Lawrence J. Stonitsch, 2338 Carnation Dr., Joliet, Ill. 60435; Richard W. Stonitsch, Rte. 1, Mound Rd., Joliet, Ill. 60436

[21] Appl. No.: 884,581

[22] Filed: Mar. 8, 1978

Related U.S. Application Data

[63] Continuation-in-part of Ser. No. 704,332, Jul. 12, 1976, Pat. No. 4,084,842.

[51] Int. Cl.² .......................................... F16L 11/12
[52] U.S. Cl. ..................................... 285/53; 285/93; 285/110; 285/138; 285/187; 285/373; 285/381; 285/423; 285/DIG. 7
[58] Field of Search ..................... 285/47, 48, 53, 50, 285/369, 52, 110, 371, 398, 54, 373, 419, 292, 293, 294, 55, 93, 138, 187, 381, 423, DIG. 7

[56] References Cited

U.S. PATENT DOCUMENTS

| | | | |
|---|---|---|---|
| 2,857,931 | 10/1958 | Lawton | 285/292 |
| 3,068,026 | 12/1962 | McKamey | 285/47 |
| 3,250,297 | 5/1966 | Mooneyham | 138/113 |
| 3,351,361 | 11/1967 | Martin | 285/47 |
| 3,410,313 | 11/1968 | Martin | 138/103 |
| 3,453,716 | 7/1969 | Cook | 285/286 |
| 3,471,177 | 10/1969 | Garrett et al. | 285/133 |
| 3,492,029 | 1/1970 | French et al. | 285/47 |
| 3,563,572 | 2/1971 | French | 285/47 |
| 3,642,308 | 2/1972 | Zeile, Jr. et al. | 285/47 |
| 3,645,564 | 2/1972 | Corriston | 285/47 |
| 3,677,303 | 7/1972 | Martin | 138/149 |
| 3,744,823 | 7/1973 | Muir | 285/47 |
| 3,747,961 | 7/1973 | Couch et al. | 285/47 |
| 3,854,756 | 12/1974 | Couch | 285/47 |
| 4,025,091 | 5/1977 | Zeile | 285/53 |

FOREIGN PATENT DOCUMENTS

| | | | |
|---|---|---|---|
| 391175 | 10/1908 | France | 285/47 |
| 1421070 | 11/1965 | France | 285/55 |
| 1213414 | 11/1970 | United Kingdom | 285/93 |
| 1421481 | 1/1973 | United Kingdom | 285/47 |
| 1335055 | 10/1973 | United Kingdom | 285/53 |
| 1365482 | 9/1974 | United Kingdom | 285/110 |
| 1435695 | 5/1976 | United Kingdom | 285/47 |

*Primary Examiner*—Dave W. Arola
*Attorney, Agent, or Firm*—Hill, Van Santen, Steadman, Chiara & Simpson

[57] ABSTRACT

Insulated jacketed conduit units sealed in end to end relation by expansion couplings are insulated, sealed and spaced at the coupling zones with protective combined spacer and sleeve rings or washers which surround the coupled ends of the conduits, are bottomed on and squeezed between the insulation of adjacent units to position the conduit ends for expansion and contraction without breaking the seal therebetween and seat on adjacent ends of the jackets to protect the insulation. The combined spacer and sleeve rings or washers can be molded to have a relatively soft compressible inner washer portion and a tough stiffer sleeve portion with resilient sealing lips in the open ends thereof for sealingly engaging the jackets.

3 Claims, 6 Drawing Figures

CONDUIT SYSTEM WITH EXPANSION COUPLING AND COMBINED SPACER AND SEALING SLEEVE

RELATED APPLICATION

This application is a continuation-in-part of the Lawrence J. Stonitsch and Richard W. Stonitsch U.S. Patent application Ser. No. 704,332, filed July 12, 1976 entitled "CONDUIT SYSTEM WITH EXPANSIBLE COUPLING", allowed Nov. 7, 1977, and now U.S. Pat. No. 4,084,842.

FIELD OF THE INVENTION

This invention relates to the art of sealing insulated jacketed conduit units joined in end to end relation by expansion couplings and protecting the coupling seal and insulation. Specifically, the invention deals with improved conduit systems of the type disclosed and claimed in the aforesaid U.S. Patent application Ser. No. 704,332, filed July 12, 1976 by simplifying and unifying the insulation and positioning ring or washer between adjacent conduit units.

The terms "tube" and "tubing" are used herein in their generic sense to include any conduit such as thin tubes, rigid pipes and the like usually composed of metals such as copper, steel, iron and the like but also including plastics materials.

SUMMARY OF THIS INVENTION

According to this invention, a single one-piece washer and sleeve unit replaces the separate washer or insulation ring, jacket sleeve, and sealing tapes of the aforesaid parent application Ser. No. 704,332, filed July 12, 1976 to simplify and improve the efficiency of insulating and sealing the coupling zones of insulated tubes. The adjoining ends of tubes are sealingly joined to a slip coupling, a resilient insulation washer or ring embraces the coupled ends of the tubing and is squeezed into firm engagement with the adjoining end faces of the insulation surrounding the tubing. A sleeve surrounds the washer and has open ends embracing the jackets of the insulated tubing units. Lip seals are provided in the mouths of the open ends of the sleeve for sealingly engaging the jackets. The combined spacer and sleeve unit is easily slipped over the coupling on one end of a tube and over the jacket of that tube. The next adjoining insulated tube length is then easily inserted into the opposite end of the combined spacer, insulator, and washer unit and is pressed against the washer to slightly squeeze the same into fully bottomed engagement with the insulation of both adjacent tube lengths. The lip seals on the sleeve of the unit automatically sealingly engage the jackets. The coupled ends of the tube units are thus insulated, properly spaced for contraction and expansion, and the insulation surrounding the tubing is sealed.

The sleeve of the combined spacer, insulator, and sleeve unit can have a vent hole therein to check leakage during the initial pressure testing of the coupled tube units which vent hole can then be easily plugged.

The sleeve portion is preferably connected to the inner washer portion of the unit only at the axial mid zone, and the end faces of the washer portion are disposed inwardly from the ends of the sleeve portion so that they may seat against the insulation and expand and contract upon relative movements of the adjacent tube units without becoming unseated.

In the event a leak develops in a coupling, it can easily be repaired by longitudinally slicing the combined spacer and sleeve unit at the leaking coupling and at the next adjacent coupling so that the units can be peeled off of the coupling permitting the tube length therebetween to be longitudinally moved for separating the coupled tube end at the leaking joint. The O-ring seal or seals of the coupling can then be replaced, the tube lengths slipped back into coupled and sealed engagement in the new O-ring and the split combined spacer and sleeve units can be wrapped around the couplings and adjacent ends of the jackets to be tightened and sealed into position by clamping rings and shrink sleeves or tapes.

It is then an object of this invention to improve and combine the insulation washers, sleeves, and seals disclosed in the aforesaid patent application Ser. No. 704,332.

Another object of this invention is to provide a combined insulator, coupling spacer, and sealing sleeve for the couplings of insulated tubing units.

Another object of this invention is to simplify the installation and repair of slip coupling seals.

A specific object of the invention is to provide a unit which spaces slip coupled insulated tubes, insulates the coupling, and seals the insulation.

Another preferred and specific object of the invention is to provide a molded plastics material combined spacer, insulator and sealing sleeve for the coupled ends of insulated and jacketed tube lengths.

Other and further objects of this invention will become apparent to those skilled in this art from the following detailed description of the annexed sheets of drawings which, by way of preferred examples, illustrate several embodiments of the invention.

ON THE DRAWINGS

AS SHOWN ON THE DRAWINGS

Figure 1:
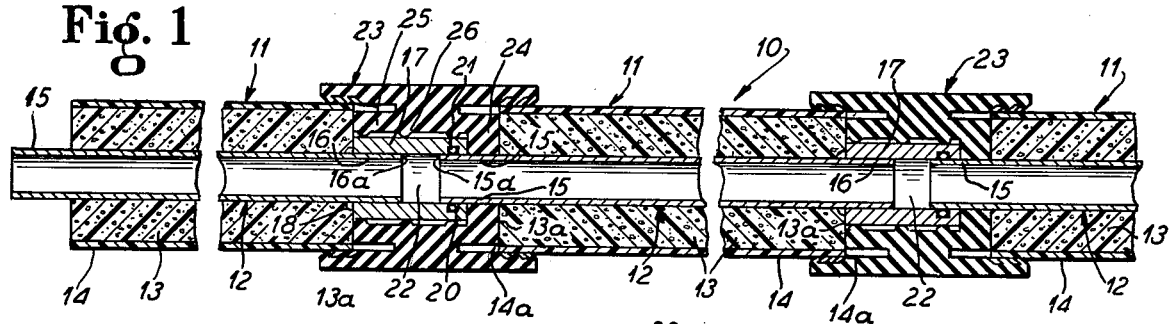
FIG. 1 is a longitudinal section of a string of jacketed insulated tube lengths sealed in end to end relation by expansion couplings and insulated, spaced and sealed by units of this invention.
Figure 2:
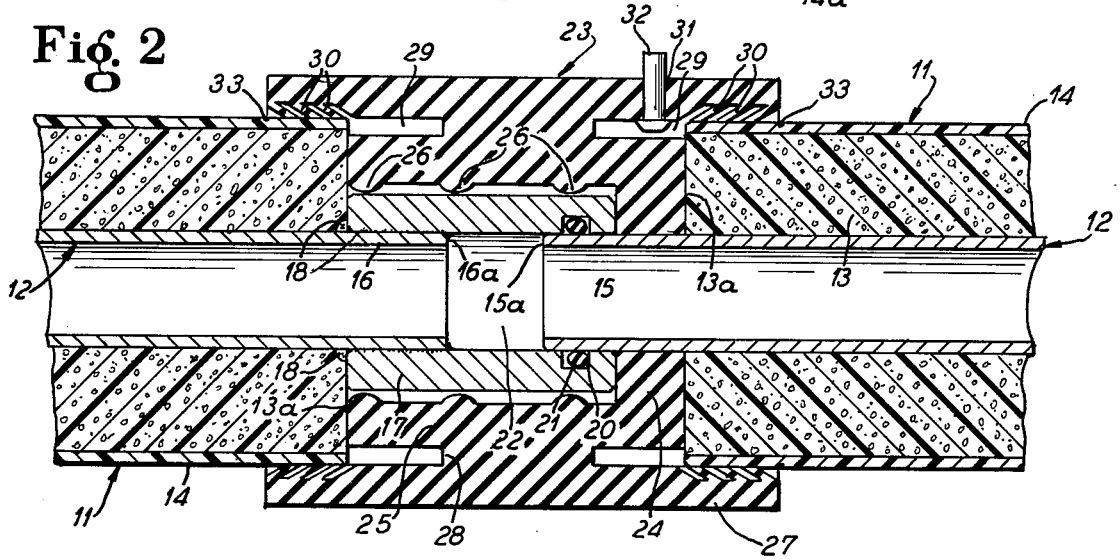
FIG. 2 is enlarged longitudinal section of one of the coupling zones of the insulated tube units of FIG. 1.

In FIG. 1, the reference numeral 10 designates generally a conduit system composed of a plurality of insulated and jacketed conduit units 11,11, 11 in end to end relation, it being understood that any desired number of units 11 can be used and that the units 11 may be of any desirable length. Generally, the conduit units 11 are 20 to 40 feet long.

Each unit 11 has a tube core 12 surrounded by a body of insulation such as a polyurethane foam 13 which in turn is enclosed in a jacket such as a polyvinyl chloride plastics tube 14. The insulation 13 has flat radial end faces 13a,13a flush with the open ends 14a,14a of the surrounding jacket 14. One end of the core 12 extends at 15 beyond the end face 13a of the insulation 13 while the opposite end of each core extends at 16 beyond the opposite end face 13a of the insulation. The end 16 has a coupling tube 17 telescoped thereover bottomed against the adjacent end wall 13a of the insulation and then projecting beyond the end 16 to embrace the end 15 of the core 12 of the adjacent unit 11. The tube 17 is fixedly sealed to the end 16 by a weld or brazed bond 18.

The end of the tube 17 embracing the projecting portion 15 of the core 12 has an internal groove 20 therearound near the free end thereof and a resilient "O" ring seal 21 is seated in this groove to sealingly and sidably engage the end 15. When the core 12 is composed of copper tubing, the coupling tube 17 is composed of brass and is generally thicker than the core 12 to provide rigidity and sufficient material for the groove 20. The end 16 of the core 12 preferably projects into the tube 17 for a sufficient distance to provide a firm seat for the tube while positioning the terminal end face 16a thereof sufficiently inward from the O-ring groove 20 so that the end 15 of the adjoining core 12 can project into the tube well beyond the O-ring 21 without having its terminal end edge 15a bottom on the edge 16a. An expansion and contraction gap 22 is thus provided between the adjoining edges 15a and 16a.

From the above descriptions, it will thus be understood that the insulated jacketed conduit units 12 are sealingly coupled in end to end relation through expansion couplings accommodating expansion and contraction of the units relative to each other.

This invention now provides combined washer, insulator, and sleeve units 23 which space the end edges 15a and 16a of adjacent cores 12 to maintain the expansion gap 22 therebetween while positioning the edge 15a sufficiently beyond the seal ring 21 to accommodate contraction without moving beyond the seal. At the same time these units 23 insulate the coupling and seal the insulation 13 surrounding the cores 12.

The units 23 of this invention have an inner resilient washer portion 24 for snugly seating on the projecting end 15 of the core 12 and bottomed on the end face 13a of the insulation 13 on one side and on the end edge of the coupling tube 17 on the other side. The washer 24 has a sleeve portion 25 surrounding the coupling tube 17 and provided with internal beads 26 seating on the tube. The end of this sleeve 25 is bottomed on the end face 13a of the insulation of the adjacent unit 11. The washer 24 is squeezed between the free end of the coupling tube 17 and the adjacent end face 13a of the insulation and has sufficient thickness to maintain the expansion gap 22 with the end edge 15a of the end 15 of the core 12 always being beyond the seal 21.

The washer portion 24 with its integral sleeve 25 insulates the coupling area since the end 15 of the core and the coupling tube 17 are completely surrounded. This inner portion of the unit 23 thus serves as a spacer and insulator.

A sleeve 27 surrounds the washer 24 and its sleeve 25 and has an internal diameter large enough to surround the jackets 14 of adjacent units 11. This sleeve 27 is connected at its midpoint to the midpoint of the washer which it surrounds by a central body portion or wall 28 leaving annular gaps 29 between the washer and sleeve at the ends of the washer. The sleeve 27 has open ends projecting beyond the ends of the washer 24 and its integral sleeve portion 25 of large enough internal diameter to embrace the end margins of adjacent jackets 14. These jacket embracing portions have internal lip seals 30 deflected into sealing engagement with the jackets.

A port hole 31 is provided through the sleeve 27 communicating with one of the annular gaps 29 to vent, for inspection, leakage of the coupling when the tube line is initially pressure tested for leakage. Then, if no leakage develops during the test, the port hole 31 is sealed by a resilient plug 32.

The sleeve portion 27 of the unit 23 thus serves as a seal protecting the insulation 13 at each coupling against moisture or deteriorating conditions surrounding the tube line.

The units 23 of this invention are preferably molded from an elastomeric plastic material having good insulation properties, and resistance to heat, low temperature, weather conditions, water and steam. Ethylene propylene elastomers are suitable. "Nordell HCR" manufactured by E. I. DuPont de Nemores and Company, Wilmington, Del. is a suitable elastomer.

If desired, the sleeve portion 27 of the unit can have a higher durameter hardness than the internal washer portion.

The conduit units 11 are easily and quickly assembled in sealed end to end relation by first slipping the sleeve portion 25 of the unit 23 over an exposed coupling tube 17 to be bottomed on the end face 13a of the insulation of the unit on which the tube 17 is welded. At the same time, the open end of the sleeve portion 27 of the unit projecting beyond the internal sleeve 25 slides over the jacket 14 with the lips or fingers of the seal 30 deflecting into sealed engagement with the jacket. The beads 26 center the unit on the coupling tube 17 but have a free fit thereon. The washer portion 24 then projects beyond the free end of the tube 17 and the projecting end 15 of the core 12 of the next adjacent unit 11 is then pushed through the washer 24 into the coupling tube 17 with its end edge 15a projecting beyond the seal ring 21. At the same time, the jacket 14 of the adjacent unit 11 is pushed through the open end of the sleeve 27 and the insulation end face 13a is bottomed on the washer 24.

For ease in determining when the washer portion of the unit is properly bottomed and squeezed to position the free end 15a properly in the expansion gap 20 and beyond the seal 21, the jackets 14 can have marking indicia such as colored stripes 33 therearound spaced inwardly from the ends of the jackets a sufficient distance so that when the units 11 are pushed into the ends of the sleeve 27 up to these lines, the washer 24 will be bottomed on the insulation and squeezed with the end 15 of the core properly seated in the coupling sleeve.

Figure 3:
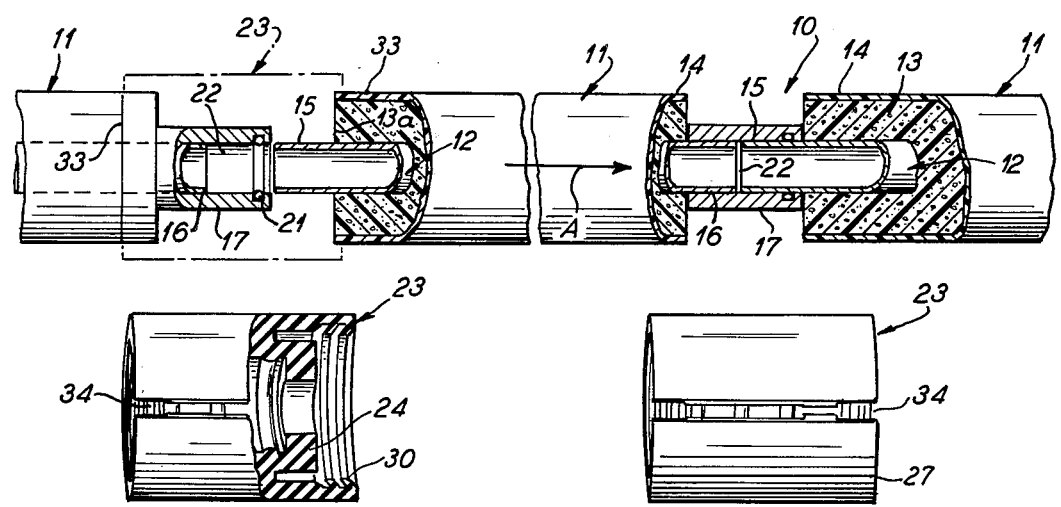
FIG. 3 is a view similar to FIG. 1 but with the spacer and sleeve units split and removed and with the middle tube length slid back to open the left hand coupling for replacement of a seal washer.

FIG. 3 illustrates the manner in which the units 23 can be removed from a conduit or tube line 10 to accommodate replacement or repair of a leaking seal 21 in an expansion coupling tube between two conduit units 11. As shown, the units 23 at opposite ends of the middle conduit length 11 are longitudinally slit at 34 and are peeled off of the conduit units and slip couplings thus opening up gaps between the adjacent ends of the conduit units and exposing the coupling tubes 17. The middle conduit unit 11 or at least the core 12 is then longitudinally shifted in the direction of the arrow A closing the expansion gap 22 of the coupling at the right hand end of the middle conduit unit and retracting the end 15 of the core 12 from the coupling tube at the left hand end of the unit thereby giving access to the seal ring 21 for repair or replacement. Then, the middle conduit unit 11 or core 12 is longitudinally shifted back to its initial position opening up the expansion gap 22 in the coupling at the right hand end and inserting the end 15 of the core 12 back into the coupling tube 17 beyond the repaired or replaced seal ring 21 at the left hand end of the conduit unit.

Figure 4:
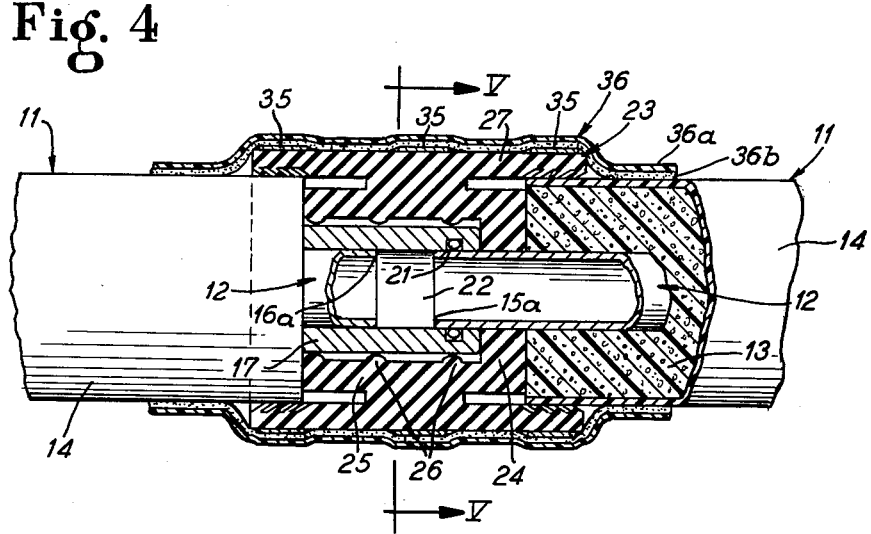
FIG. 4 is a view similar to FIG. 2 but showing a split spacer and sleeve around the coupling and having its split ends closed by clamps and sealed by a shrink sleeve tape.
Figure 5:
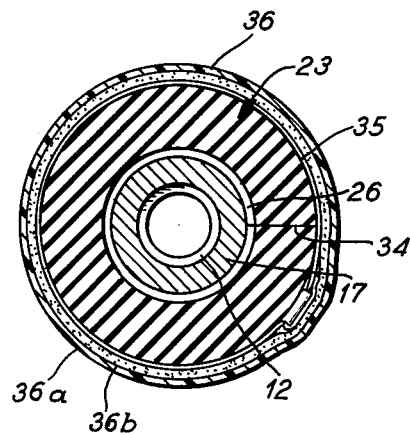
FIG. 5 is a transverse cross-section along the lines V—V of FIG. 4.

The split units 23 are then wrapped around their respective couplings and jackets, and as shown in FIGS. 4 and 5, clamping bands 35 are tightened around the sleeve portion 27 of the units 23 to seal together the split ends 34 as shown in FIG. 5. The clamping bands 35 are preferably disposed around the end portions of the sleeve 27 which are seated on the jackets 14 and also around the middle of the sleeve portion.

The clamped replaced units 23 can, if desired, be further sealed by a plastics shrink sleeve 36 around the unit 23 and the clamping bands 35 and also around the portions of the jackets 14 adjacent the ends of the unit. A suitable shrink-type plastic sleeve is composed of polyethylene 36a with an asphalt coating 35b on the underface thereof such as furnished by Raychem Company of Redwood, Calif.

The clamped split units 23 with their covering sleeves return the split units to their full sealing capacity.

Figure 6:
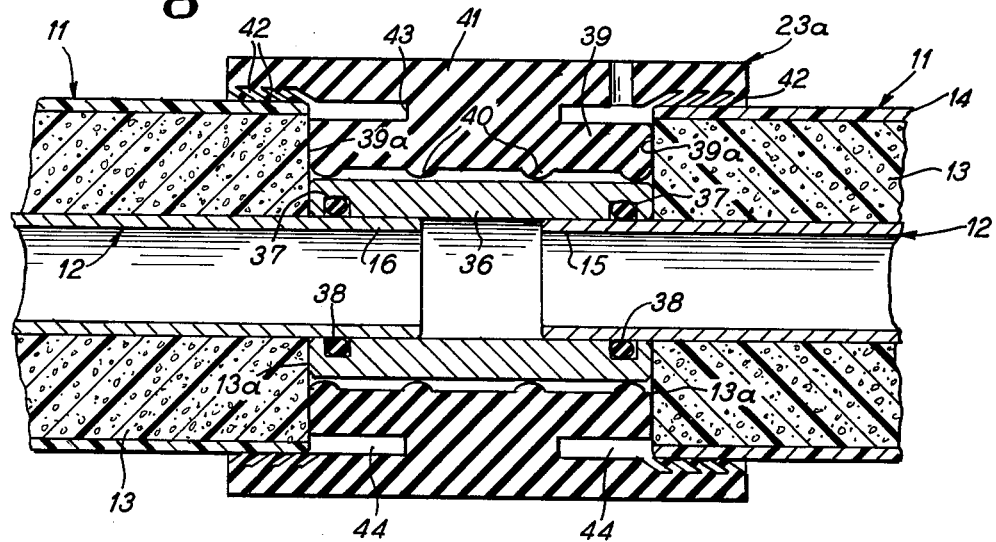
FIG. 6 is a view similar to FIG. 2 but illustrating a coupling having a free sleeve and two O-rings.

As shown in FIG. 6, the units 23 of this invention are also useful in slip coupling installations having a coupling sleeve 36 slidably mounted on adjoining ends 15 and 16 of the conduit cores 12. This sleeve 36 has grooves 37 around the inner periphery thereof adjacent both ends of the sleeve and each groove receives an O-ring seal 38 slidably receiving the respective ends 15 and 16 of the cores 12. Since both ends 15 and 16 can slide in the sleeve 36, the ends of the sleeve can be bottomed against the end faces 13a of the insulation of adjoining conduit units 11 and a modified spacer, insulator, and sealing unit 23a is provided with an inner sleeve portion 39 having internal beads 40 seated on the coupling sleeve 36 and end faces 39a bottomed on the end faces 13a of the insulation. The surrounding sleeve 41 is the same as the sleeve 27 of the unit 23 and has open ends slipped over the adjoining jackets 14 with lip seals 42 sealingly engaging these jackets. A central body 43 unites the inner sleeve 39 with the outer sleeve 41 and annular grooves 44 are provided between the two sleeves on opposite sides of this body portion 43. The inner sleeve 39 is squeezed between the end faces 13a of the insulation of the adjoining conduit units 11 to expand and remain in contact with the end faces during contraction of adjoining conduit units 11. The units 23a thus serve the same functions as the units 23 in spacing, insulating, and sealing the slip couplings.

From the above descriptions, it will be understood that this invention provides unitary insulators, spacers, and seals for expansion and contraction couplings in insulated and jacketed conduit systems. The improved units of this invention are easily installed and can be split and peeled off the expansion coupling to permit access to a damaged or worn out seal. The split units are then easily reinstalled and sealed.

We claim as our invention:

1. A unitary member for insulating, spacing, and sealing expansion couplings between adjacent ends of insulated jacketed tubing which comprises a sleeve member of resilient material having an inner sleeve portion with a reduced diameter bore at one end adapted for directly seating on the tubing of a conduit unit and an enlarged recess for freely surrounding a coupling on the tubing, said reduced diameter bore end portion of the inner sleeve adapted to be squeezed between the coupling and the adjacent insulation of a conduit unit, an outer sleeve surrounding the inner sleeve in spaced relation therefrom and projecting beyond the ends of the inner sleeve, a central body portion uniting the inner and outer sleeves accommodating squeezing of the inner sleeve relative to the outer sleeve, said outer sleeve having open ends projecting beyond the inner sleeve for surrounding the jackets of adjoining conduit units and lip seals around the inner peripheries of the open ends of the outer sleeve adapted to be deflected by the jackets into sealed engagement therewith.

2. The member of claim 1 including internal beads in the inner sleeve for seating on the coupling.

3. The member of claim 1 including annular gaps between the inner sleeve portion and the outer sleeve.

* * * * *